(12) United States Patent
Lee et al.

(10) Patent No.: US 9,760,331 B2
(45) Date of Patent: Sep. 12, 2017

(54) SHARING A SCREEN BETWEEN ELECTRONIC DEVICES

(71) Applicant: Samsung Electronics Co., Ltd., Gyeonggi-do (KR)

(72) Inventors: Woo-Kwang Lee, Gyeonggi-do (KR); Hyuk Kang, Gyeonggi-do (KR); Guneet Singh Khurana, Gyeonggi-do (KR); Hyun-Ho Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 88 days.

(21) Appl. No.: 14/718,418

(22) Filed: May 21, 2015

(65) Prior Publication Data

US 2015/0339090 A1 Nov. 26, 2015

(30) Foreign Application Priority Data

May 23, 2014 (KR) ........................ 10-2014-0062334

(51) Int. Cl.
| | |
|---|---|
| *G06F 3/14* | (2006.01) |
| *G06F 3/147* | (2006.01) |
| *G06F 3/041* | (2006.01) |
| *G06F 3/0486* | (2013.01) |
| *G06F 3/0488* | (2013.01) |
| *G06F 3/0484* | (2013.01) |
| *G09G 5/12* | (2006.01) |

(52) U.S. Cl.
CPC .............. *G06F 3/14* (2013.01); *G06F 3/0488* (2013.01); *G06F 3/04845* (2013.01); *G06F 3/04883* (2013.01); *G06F 3/1454* (2013.01); *G06F 3/0416* (2013.01); *G09G 5/12* (2013.01)

(58) Field of Classification Search
CPC ...... G06F 3/14; G06F 3/0416; G06F 3/04845; G06F 3/0488; G06F 3/04883; G09G 5/12
See application file for complete search history.

(56) References Cited

U.S. PATENT DOCUMENTS

| | | | |
|---|---|---|---|
| 7,870,496 B1 * | 1/2011 | Sherwani | ................ H04L 67/38 715/718 |
| 8,751,973 B2 | 6/2014 | Han et al. | |
| 8,803,817 B1 * | 8/2014 | Froment | ............... G06F 3/0488 345/1.1 |
| 2003/0110925 A1 * | 6/2003 | Sitrick | ................. G09B 15/002 84/477 R |
| 2005/0093868 A1 * | 5/2005 | Hinckley | ................. G06F 3/011 345/502 |

(Continued)

FOREIGN PATENT DOCUMENTS

| KR | 10-2007-0111592 A | 11/2007 |
|---|---|---|
| KR | 10-2013-0104005 A | 9/2013 |

*Primary Examiner* — Michael J Eurice
(74) *Attorney, Agent, or Firm* — Cha & Reiter, LLC.

(57) ABSTRACT

A screen sharing method for an electronic device is provided. A first device communicates with a second device and shares a first screen. At the first device, a specific image is displayed superposed with the first screen, where the specific image is excluded from the first screen shared with the second electronic device. The second screen is thereafter shared with the second device. An intuitive user interface for editing a shared screen and thereafter sharing the edited screen is thus provided.

18 Claims, 17 Drawing Sheets

(56) References Cited

U.S. PATENT DOCUMENTS

| | | | | |
|---|---|---|---|---|
| 2005/0146621 A1* | 7/2005 | Tanaka | ............... | H04N 1/00127 348/211.2 |
| 2012/0038541 A1* | 2/2012 | Song | ..................... | G06F 3/1423 345/1.1 |
| 2012/0060089 A1* | 3/2012 | Heo | ....................... | G06F 1/1647 715/702 |
| 2012/0088549 A1* | 4/2012 | Yun | ........................ | G06F 1/1647 455/557 |
| 2012/0139951 A1* | 6/2012 | Hwang | ............... | G06F 3/04883 345/665 |
| 2012/0190386 A1* | 7/2012 | Anderson | .............. | G01C 15/04 455/456.3 |
| 2012/0197998 A1* | 8/2012 | Kessel | ................ | H04L 67/1095 709/205 |
| 2012/0278752 A1* | 11/2012 | Parker | ................... | G06F 3/0488 715/780 |
| 2012/0304087 A1* | 11/2012 | Walkin | .............. | G06F 17/30241 715/764 |
| 2012/0311438 A1* | 12/2012 | Cranfill | ............. | G06F 17/30011 715/256 |
| 2013/0021379 A1* | 1/2013 | Sirpal | ................... | G06F 1/1616 345/659 |
| 2013/0086480 A1* | 4/2013 | Sirpal | ................... | G06F 3/1438 715/744 |
| 2013/0103446 A1* | 4/2013 | Bragdon | ............ | G06Q 10/1095 705/7.15 |
| 2013/0215116 A1* | 8/2013 | Siddique | ............ | G06Q 30/0643 345/420 |
| 2013/0235068 A1* | 9/2013 | Ubillos | .................. | G09G 5/026 345/594 |
| 2013/0239020 A1 | 9/2013 | Heo et al. | | |
| 2014/0223313 A1* | 8/2014 | Aebi | .................... | G06F 3/04845 715/733 |
| 2014/0236728 A1* | 8/2014 | Wright | ............... | G06Q 30/0272 705/14.58 |
| 2014/0240440 A1* | 8/2014 | Seo | ......................... | H04L 51/04 348/14.03 |
| 2014/0245190 A1* | 8/2014 | Bragdon | ............ | G06Q 10/1095 715/753 |
| 2015/0031352 A1* | 1/2015 | Yi | ........................ | G01C 21/206 455/420 |
| 2015/0077326 A1* | 3/2015 | Kramer | ................. | G06F 3/0325 345/156 |
| 2015/0286456 A1* | 10/2015 | Griffin | ................. | G06F 3/1446 345/1.2 |
| 2016/0103569 A1* | 4/2016 | Zatalovski | ............ | G06F 3/0482 715/738 |
| 2016/0283685 A1* | 9/2016 | Jordan | ................... | H04N 7/142 |

\* cited by examiner

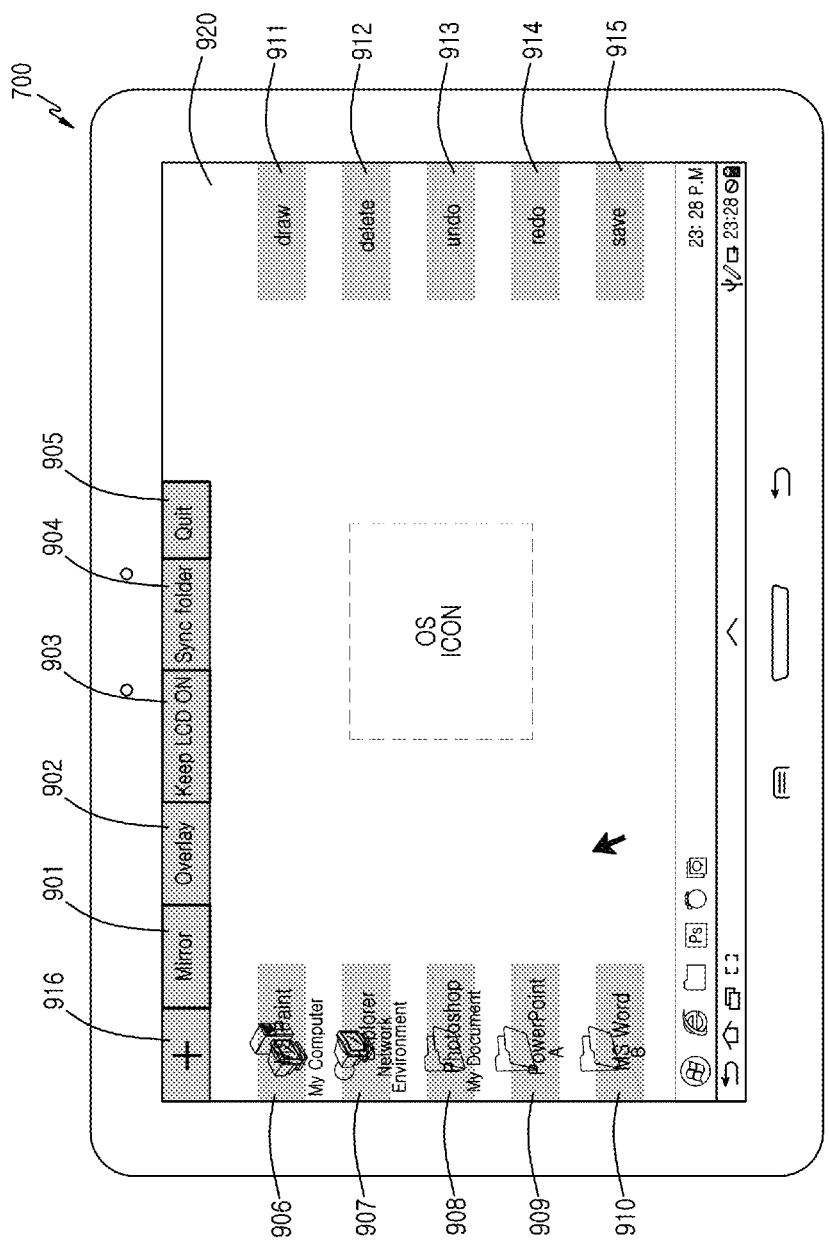

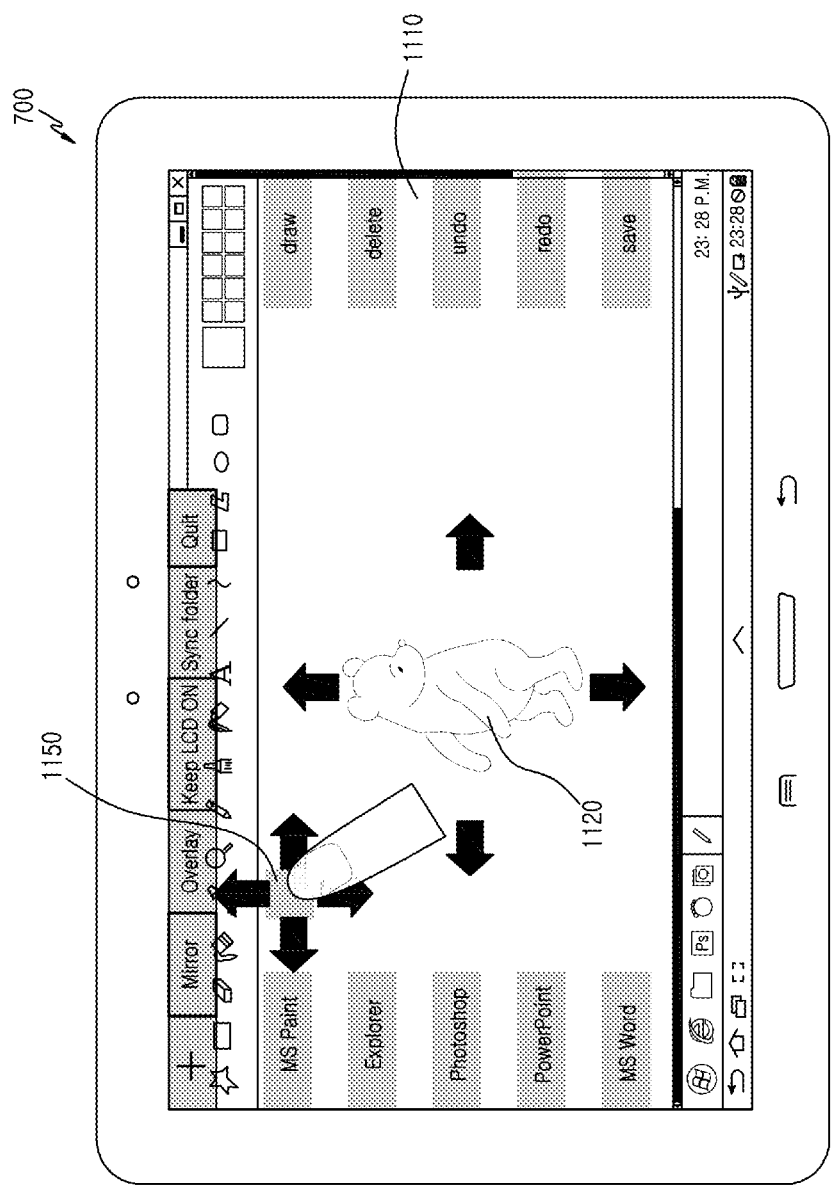

SHARING A SCREEN BETWEEN ELECTRONIC DEVICES

CLAIM OF PRIORITY

This application claims the benefit under 35 U.S.C. §119(a) of a Korean patent application filed in the Korean Intellectual Property Office on May 23, 2014 and assigned Serial number. 10-2014-0062334, the entire disclosure of which is hereby incorporated by reference.

BACKGROUND

1. Technical Field

The present disclosure relates generally to a method for sharing a screen and an electronic device performing such a method.

2. Description of the Related Art

With recent advances in information, communication and semiconductor technologies, various electronic devices have developed into multimedia devices which provide various multimedia services. For example, an electronic device may provide various multimedia services such as messaging, broadcast reception, wireless Internet, digital photography, music playing, and so forth.

As touch screen technology has developed in recent years, a device user may use an application program to draw a picture on a screen by using his or her finger, a touch pen, or the like, and the electronic device provides a service of transmitting such a picture to other electronic devices.

SUMMARY

In order to draw or embellish a specific picture on an electronic device equipped with a touch screen, the user may hand trace over a currently displayed image using the naked eye. In addition, the user may download or install a specific application to receive a service or function for a drawing work.

An aspect of the present disclosure is to provide a method and electronic device for sharing a screen to provide various services by interworking with another electronic device.

Another aspect of the present disclosure is to provide a method for sharing a screen, which can allow a user to easily draw a picture by tracing an image on an electronic device, and an electronic device implementing the same.

Another aspect of the present disclosure is to provide a method and electronic device for sharing a screen, which can enhance drawing work efficiency by interworking with another electronic device.

In accordance with an aspect of the present disclosure, a method performed by a first electronic device is provided. The method includes communicating with a second electronic device via a direct connection and sharing a first screen, and creating and displaying a second screen by superposing a specific image retrieved from a storage in the first or second electronic device, which is excluded from the first screen. The second screen is then shared with the second electronic device. In accordance with another aspect of the present disclosure, an electronic device includes a communication module, a display functionally connected with the communication module, and a processor configured to communicate with another electronic device and share a first screen, display a specific image which is excluded from the first screen shared with the other electronic device on a screen; and share a created second screen which includes the specific image with the other electronic device.

The method for sharing the screen and the electronic device thereof according to various exemplary embodiments may provide various services by interworking with another electronic device. The method for sharing the screen and the electronic device thereof according to various exemplary embodiments may provide user convenience for a user to easily draw a picture by tracing an image. The method for sharing the screen and the electronic device thereof according to various exemplary embodiments may enhance drawing work efficiency by interworking with another electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 illustrates a view showing a state in which an electronic device shares a screen with another electronic device according to an exemplary embodiment of the present disclosure;

FIG. 11A, FIG. 11B, FIG. 11C and FIG. 11D illustrate views showing a method for adjusting an image which is loaded in an electronic device according to an exemplary embodiment of the present disclosure;

DETAILED DESCRIPTION

Figure 1:
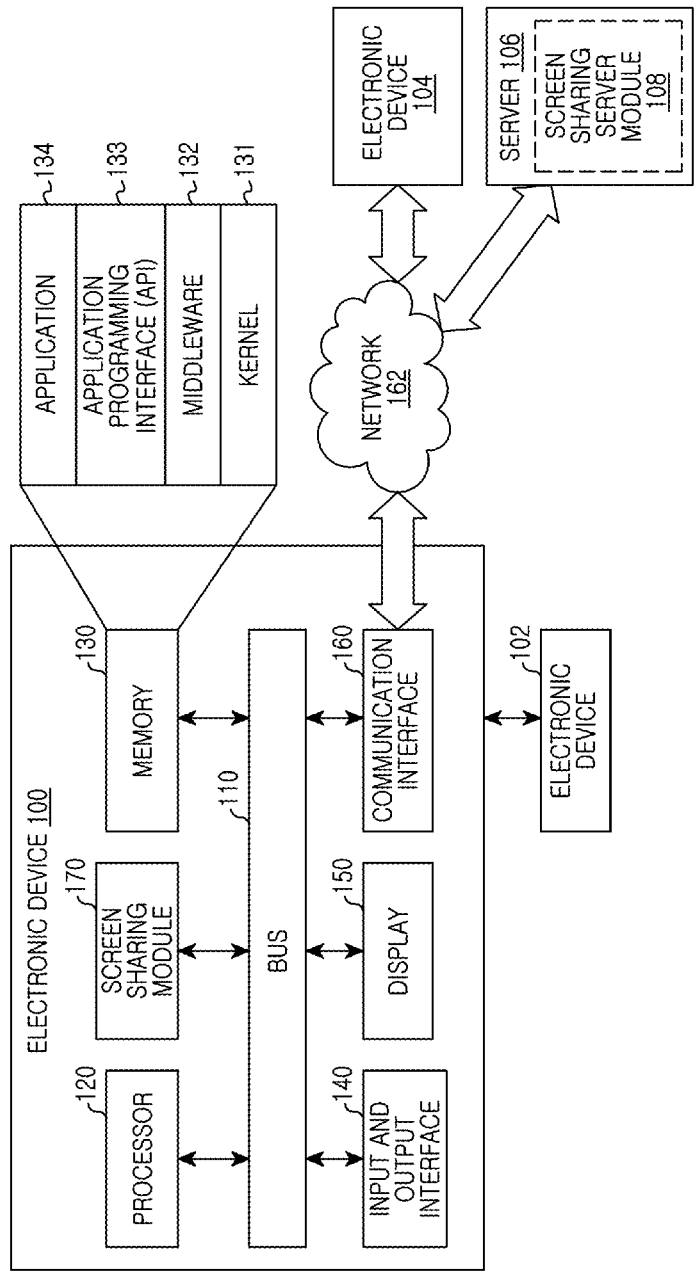
FIG. 1 illustrates a block diagram showing an electronic device according to an exemplary embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. Accordingly, various exemplary embodiments of the present disclosure are not limited to the specific embodiments and should be construed as including all changes and/or equivalents or substitutes included in the ideas and technological scope of the appended claims. In the explanation of the drawings, similar reference numerals are used for similar elements.

The terms "include" or "may include" used in the exemplary embodiments of the present disclosure indicate the presence of disclosed corresponding functions, operations, elements, and the like, and do not limit additional one or more functions, operations, elements, and the like. In addition, it should be understood that the terms "include" or "have" used in the exemplary embodiments of the present disclosure are to indicate the presence of features, numbers, steps, operations, elements, parts, or a combination thereof described in the specification, and do not preclude the presence or addition of one or more other features, numbers, steps, operations, elements, parts, or a combination thereof.

The terms "or" or "at least one of A or/and B" used in the exemplary embodiments of the present disclosure include any and all combinations of words enumerated with them. For example, "A or B" or "at least one of A or/and B" mean including A, including B, or including both A and B.

Although the terms such as "first" and "second" used in the various exemplary embodiments of the present disclosure may modify various elements of the various exemplary embodiments, these terms do not limit the corresponding elements. For example, these terms do not limit an order and/or importance of the corresponding elements. These terms may be used for the purpose of distinguishing one element from another element. For example, a first electronic device and a second electronic device all indicate electronic devices and may indicate different electronic devices. For example, a first element may be named a second element without departing from the scope of the various exemplary embodiments of the present disclosure, and similarly, a second element may be named a first element.

It will be understood that, when an element is mentioned as being "connected" or "coupled" to another element, the element may be directly connected or coupled to another element, and there may be an intervening element between the element and another element. To the contrary, it will be understood that, when an element is mentioned as being "directly connected" or "directly coupled" to another element, there is no intervening element between the element and another element.

The terms used in the various exemplary embodiments of the present disclosure are for the purpose of describing specific exemplary embodiments only and are not intended to limit various exemplary embodiments of the present disclosure. As used herein, the singular forms are intended to include the plural forms as well, unless the context clearly indicates otherwise.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having inconsistent or exaggerated meanings unless they are clearly defined in the various exemplary embodiments.

An electronic device according to various exemplary embodiments of the present disclosure (hereafter interchangeably, just "device" for brevity) may be a device that is equipped with a communication function. For example, the electronic device may include at least one of a smartphone, a tablet personal computer (PC), a mobile phone, a video phone, an electronic book reader, a desktop PC, a laptop PC, a netbook computer, a Personal Digital Assistant (PDA), a Portable Multimedia Player (PMP), an MP3 player, a mobile medical machine, a camera, or a wearable device (for example, a head-mounted-device (HMD) such as electronic glasses, electronic clothing, an electronic bracelet, an electronic necklace, an electronic appcessory, electronic tattoos, or a smart watch).

According to various exemplary embodiments of the present disclosure, the electronic device may be a smart home appliance which is equipped with a communication function. For example, the smart home appliance may include at least one of a television, a Digital Video Disk (DVD) player, a stereo, a refrigerator, an air conditioner, a cleaner, an oven, a microwave oven, a washing machine, an air cleaner, a set-top box, a TV box (for example, Samsung HomeSync™, Apple TV™, or Google TV™), a game console, an electronic dictionary, an electronic key, a camcorder, or an electronic album.

According to various exemplary embodiments of the present disclosure, the electronic device may include at least one of various medical machines equipped with a communication function (for example, Magnetic Resonance Angiography (MRA), Magnetic Resonance Imaging (MRI), Computed Tomography (CT), a tomograph, an ultrasound machine, and the like), a navigation device, a Global Positioning System (GPS) receiver, an Event Data Recorder (EDR), a Flight Data Recorder (FDR), an automotive infotainment device, electronic equipment for ship (for example, navigation equipment for ship, a gyro compass, and the like), avionics, a security device, or an industrial or home robot.

According to various exemplary embodiments of the present disclosure, the electronic device may include at least one of a part of furniture or a building/a structure including a communication function, an electronic board, an electronic signature receiving device, a projector, and various measurement devices (for example, devices for measuring water, power, gas, radio waves, and the like).

The electronic device according to various exemplary embodiments of the present disclosure may be one or a combination of one or more of the above-mentioned devices. In addition, the electronic device according to various exemplary embodiments of the present disclosure may be a flexible device. In addition, the electronic device according to various exemplary embodiments of the present disclosure is not limited to the above-mentioned devices.

Hereinafter, an electronic device according to various exemplary embodiments will be explained with reference to the accompanying drawings. The term "user" used in the various exemplary embodiments may refer to a person who uses the electronic device or a device that uses the electronic device (for example, an artificial intelligence electronic device).

FIG. 1 is a block diagram illustrating an electronic device and an operating environment thereof according to an exemplary embodiment of the present disclosure. Briefly, in a screen sharing mode, a first electronic device 100 may share a first screen with a second electronic device 102 (the first screen may originate with the second device 102 or 104 or with the first device 100). During this screen sharing mode, the first device may edit the first screen by drawing, superposing or annexing an image thereon, creating a second screen. The first device 100 may then share the second screen with the second device 102 or 104. The second device 102 or 104 may be communicatively connected to the first device 100 in a wired or wireless manner directly, i.e., without an intermediary server. The electronic device 100 may include a bus 110, a processor 120, a memory 130, an input and output interface 140, a display 150, a communication interface 160, and a screen sharing module 170. According to an exemplary embodiment, the screen sharing module 170 may be included in the processor 120 and operated or may be included in a separate module and interwork with the processor 120.

The bus 110 may be a circuit which connects the above-described elements with one another and transmits communication (for example, a control message) between the above-described elements.

The processor 120 may receive instructions from the other elements (for example, the memory 130, the input and output interface 140, the display 150, the communication interface 160, or the screen sharing module 170) via the bus 110, decipher the instructions, and perform calculation or data processing according to the deciphered instructions. According to an exemplary embodiment, the processor 120 may control communication operations with the second electronic device 102 and share a first screen, display a specific image which is excluded from the first screen shared with the second device 102, and share a second screen which is created and includes the specific image with the second device 102.

The memory 130 may store instructions or data which is received from or generated by the processor 120 or the other elements (for example, the input and output interface 140, the display 150, the communication interface 160, the screen sharing module 170, and the like).

For example, the memory 130 may include programming modules such as a kernel 131, middleware 132, an Application Programming Interface (API) 133, an application 134, and the like. Each of the above-described programming modules may be configured by software, firmware, hardware, or any combination thereof.

According to an exemplary embodiment, the kernel 131 may control or manage system resources (for example, the bus 110, the processor 120, the memory 130, and the like) which are used for performing operations or functions implemented in the other programming modules, for example, the middleware 132, the API 133, or the application 134. In addition, the kernel 131 may provide an interface for allowing the middleware 132, the API 133, or the application 134 to access an individual element of the electronic device 100 and control or manage the element.

According to an exemplary embodiment, the middleware 132 may serve as an intermediary to allow the API 133 or the application 134 to communicate with the kernel 131 and exchange data with the kernel 131. In addition, the middleware 132 may perform controlling (for example, scheduling or load balancing) with respect to work requests received from the application 134, for example, by giving priority to use the system resources of the electronic device 100 (for example, the bus 110, the processor 120, the memory 130, and the like) to at least one of the applications 134.

According to an exemplary embodiment, the API 133 may be an interface for allowing the application 134 to control a function provided by the kernel 131 or the middleware 132, and, for example, may include at least one interface or function (for example, instructions) for controlling a file, controlling a window, processing an image, or controlling a text.

According to an exemplary embodiment, the application 134 may include a Short Message Service (SMS)/Multimedia Messaging Service (MMS) application, an email application, a calendar application, a notification application, a health care application (for example, an application for measuring exercise or a blood sugar), an environment information application (for example, an application for providing information on atmospheric pressure, humidity, or temperature), and the like. Additionally or alternatively, the application 134 may be an application related to information exchange between the electronic device 100 and an external electronic device (for example, an electronic device 104). For example, the application related to the information exchange may include a notification relay application for relaying specific information to an external electronic device or a device management application for managing an external electronic device.

For example, the notification relay application may include a function of relaying notification information generated by other applications of the electronic device 100 (for example, the SMS/MMS application, the email application, the health care application, the environment information application, and the like) to an external electronic device (for example, the electronic device 102 or 104). Additionally or alternatively, the notification relay application may receive notification information from an external electronic device (for example, the electronic device 102 or 104) and may provide the same to the user. For example, the device management application may manage (for example, install, delete or update) a function regarding at least part of an external electronic device (for example, the electronic device 102 or 104) communicating with the electronic device 100 (for example, turning on/off the external electronic device (or some parts) or adjusting brightness (or resolution) of a display), an application operating in the external electronic device or a service provided by the external electronic device (for example, a calling service or a message service).

According to various exemplary embodiments, the application 134 may include an application which is specified according to the attribute (for example, a kind of an electronic device) of an external electronic device (for example, the electronic device 102 or 104). For example, when the external electronic device is an MP3 player, the application 134 may include an application related to music replay. Similarly, when the external electronic device is a mobile medical device, the application 134 may include an application related to health care. According to an exemplary embodiment, the application 134 may include at least one of an application specified by the electronic device 100 or an application received from an external electronic device (for example, a server 106 or the electronic device 102 or 104).

According to an exemplary embodiment, the input and output interface 140 may transmit instructions or data inputted by a user through an input and output device (for example, a sensor, a keyboard or a touch screen) to the processor 120, the memory 130, the communication interface 160, or the screen sharing module 170 through the bus 110, for example. For example, the input and output interface 140 may provide data on a user's touch inputted through a touch screen to the processor 120. In addition, the input and output interface 140 may output instructions or data received from the processor 120, the memory 130, the communication interface 160, or the screen sharing module 170 through the bus 110 through the input and output device (for example, a speaker or a display). For example, the input and output interface 140 may output voice data processed through the processor 120 to the user through a speaker.

According to an exemplary embodiment, the display 150 may display a variety of information (for example, multimedia data, text data, and the like) for the user.

According to an exemplary embodiment, the communication interface 160 may connect communication between the electronic device 100 and an external device (for example, the electronic device 102 or 104 or the server 106). For example, the communication interface 160 may be connected to a network 162 via wireless communication or wire communication to communicate with the external device (for example, the electronic device 102 or 104). The wireless communication may include at least one of Wireless Fidelity (WiFi), Bluetooth (BT), Near Field Communication (NFC), a GPS, or cellular communication (for example, LTE, LTE-A, CDMA, WCDMA, UMTS, WiBro, GSM, and the like). The wire communication may include at least one of a Universal Serial Bus (USB), a High Definition Multimedia Interface (HDMI), a Recommended Standard 232 (RS-232), or plain old telephone service (POTS).

According to an exemplary embodiment, the network 162 may be a telecommunications network. The telecommunications network may include at least one of a computer network, Internet, Internet of things, or a telephone network. According to an exemplary embodiment, a protocol for communicating between the electronic device 100 and the external device (for example, a transport layer protocol, a data link layer protocol or a physical layer protocol) may be supported in at least one of the application 134, the application programming interface 133, the middleware 132, the kernel 131, or the communication interface 160.

According to an exemplary embodiment, the server 106 may support driving of the electronic device 100 by performing at least one of the operations (functions) implemented in the electronic device 100. For example, the server 106 may include a screen sharing server module 108 to support the screen sharing module 170 implemented in the electronic device 100. According to an exemplary embodiment, the screen sharing server module 108 may include at least one element of the screen sharing module 170 and perform at least one of the operations implemented in the screen sharing module 170 (for example, on behalf of the screen sharing module 170).

According to an exemplary embodiment, the screen sharing module 170 may process at least part of information acquired from the other elements (for example, the processor 120, the memory 130, the input and output interface 140, the communication interface 160, or the like), and provide the information to the user in various methods. For example, the screen sharing module 170 may control at least some function of the electronic device 100 such that the electronic device 100 interworks with another electronic device (for example, the electronic device 102 or 104 or the server 106) using the processor 120 or independently from the processor 120. According to an exemplary embodiment, at least one element of the screen sharing module 170 may be included in the server 106 (for example, the screen sharing server module 108), and may be supported with at least one operation to be implemented in the screen sharing module 170 by the server 106.

Figure 2:
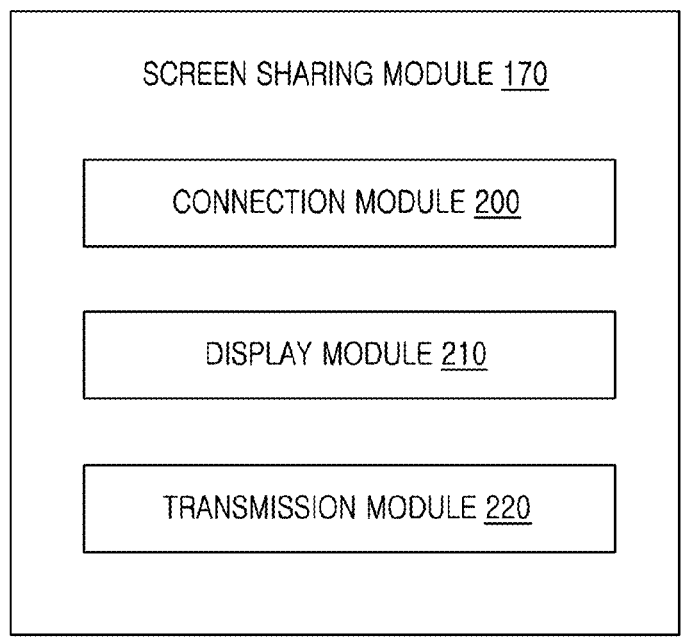
FIG. 2 illustrates a block diagram showing a screen sharing module according to an exemplary embodiment of the present disclosure.
Figure 3:
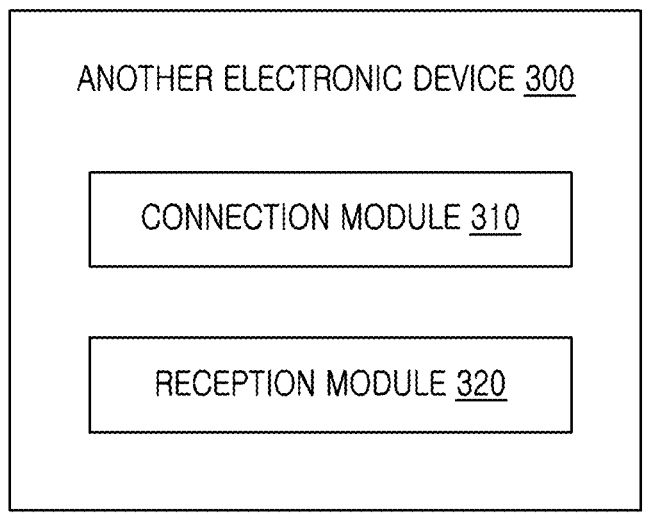
FIG. 3 illustrates a block diagram showing a configuration of another electronic device according to an exemplary embodiment of the present disclosure.

FIG. 2 is a block diagram illustrating a screen sharing module according to an exemplary embodiment of the present disclosure, and FIG. 3 illustrates a simplified block diagram showing components of another (second) electronic device, 300, according to an exemplary embodiment of the present disclosure. The second device 300 is an example of the external device 102 or 104 of FIG. 1.

Referring to FIGS. 2 and 3, the screen sharing module 170 may include a connection module 200, a display module 210, and a transmission module 220. According to an exemplary embodiment, each of the modules of the screen sharing module 170 may be included in the processor and operated or may be included in a separate module and interwork with the processor.

According to an exemplary embodiment, the connection module 200 may include at least one software element for connecting the device 100 with the second device 300. For example, the connection module 200 may be connected with a connection module 310 of the second device 300 via a Universal Serial Bus (USB). In addition, the connection module 200 may be connected with the connection module 310 of the device 300 in various series communication or parallel communication methods. According to an exemplary embodiment, the connection module 200 may implement a handshake procedure to exchange driver information while being connected with the connection module 310 of the second device 300. For example, the handshake may include, when the connection module 200 is connected with the connection module 310 in the USB communication method, identifying what external device is connected with the electronic device 100 and exchanging driver information necessary for mutual connection.

According to an exemplary embodiment, the display module 210 may include at least one software element for displaying screen information of the second device 300 connected with device 100 on the display of device 100. According to an exemplary embodiment, the display module 210 may include a USB gadget driver for decoding the screen information which was encoded in device 300 and displaying the decoded screen information. According to an exemplary embodiment, the display module 210 may load and display a specific image while the electronic device 100 is connected with device 300. For example, the display module 210 may load a specific image which is stored in device 100 or a specific image which is stored in device 300. According to an exemplary embodiment, the display module 210 may output the loaded image by superposing the image on the screen.

According to an exemplary embodiment, the transmission module 220 may include at least one software element for transmitting data which is inputted through device 100 to device 300. For example, the transmission module 220 may transmit screen information which is inputted through the device 100 to a reception module 320 of device 300.

According to an exemplary embodiment, the transmission module 220 may encode the inputted screen information and provide the encoded screen information to the reception module 320 of device 300 through bulk transmission.

According to various exemplary embodiments of the present disclosure, a first electronic device that shares a screen with a second electronic device may include a communication module, a display functionally connected with the communication module, and a processor configured to communicate with the second device and share a first screen, display a specific image which is excluded from the first screen, create a second screen including the specific image, and share the second screen with a second electronic device.

According to various exemplary embodiments, the processor may be configured to display the specific image by superposing the specific image on the first screen.

According to various exemplary embodiments, the processor may be configured to identify a touch event associated with the specific image, and adjust the specific image according to the touch event.

According to various exemplary embodiments, the processor may be configured to adjust at least one of transparency of the specific image or an intensity of a filter of the specific image according to inputted dragging.

According to various exemplary embodiments, the processor may be configured to display an object related to the specific image and move the specific image according to the movement of the object.

According to various exemplary embodiments, the processor may be configured to apply a filter effect to the specific image.

According to various exemplary embodiments, the processor may be configured to display at least one object which is mapped onto at least one of an application, a shortcut key, or a command related to another electronic device.

Figure 4:
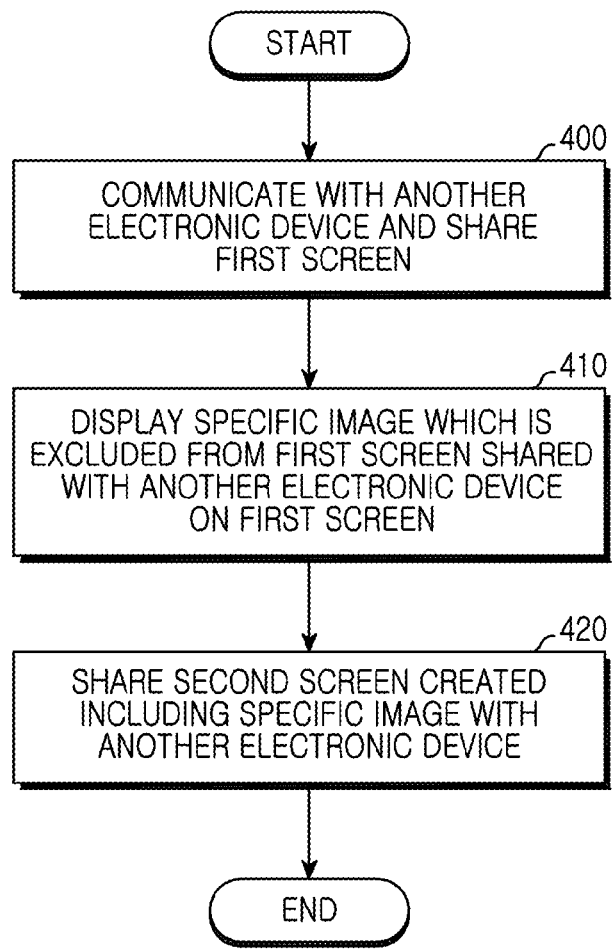
FIG. 4 is a flow chart illustrating a procedure in which an electronic device shares a screen with another electronic device according to an exemplary embodiment of the present disclosure.

FIG. 4 is a flow chart illustrating a procedure in which an electronic device (first device) shares a screen with another (second) electronic device according to an exemplary embodiment of the present disclosure.

Figure 7:
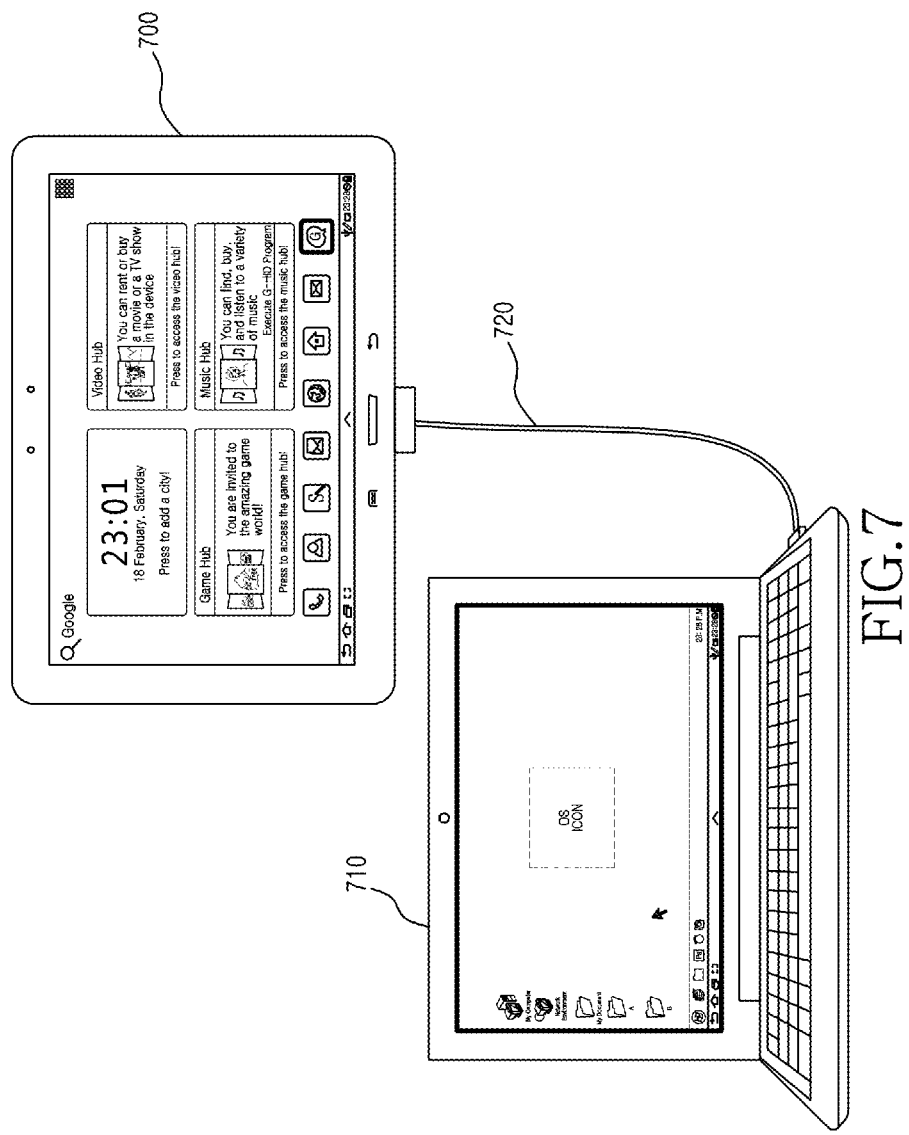
FIG. 7 illustrates a view showing an electronic device which is connected with another electronic device according to an exemplary embodiment of the present disclosure.

As shown in FIG. 4, in operation 400, the first device may communicate with the second device and share a first screen with the second device. For example, as shown in FIG. 7, a first electronic device 700 may be connected with a second electronic device 710 via a USB cable 720. (In the example of FIG. 7, a tablet computer and a laptop are given as examples; however, devices 700 and 710 may be any suitable type of electronic device such as those listed above. Device 700 is an example of device 100 of FIG. 1; device 710 is an example of device 102 or 104 of FIG. 1.)

Alternatively, the connection between first and second devices 700, 710 may be any other suitable wired or wireless connection. According to various exemplary embodiments, the electronic device 700 may implement a handshake procedure to exchange driver information while being connected with the second device 710. For example, a handshake method may include, when device 700 is connected with device 710 in the USB communication method, identifying what external device is connected with the electronic device 700 and exchanging driver information necessary for mutual connection.

Figure 8:
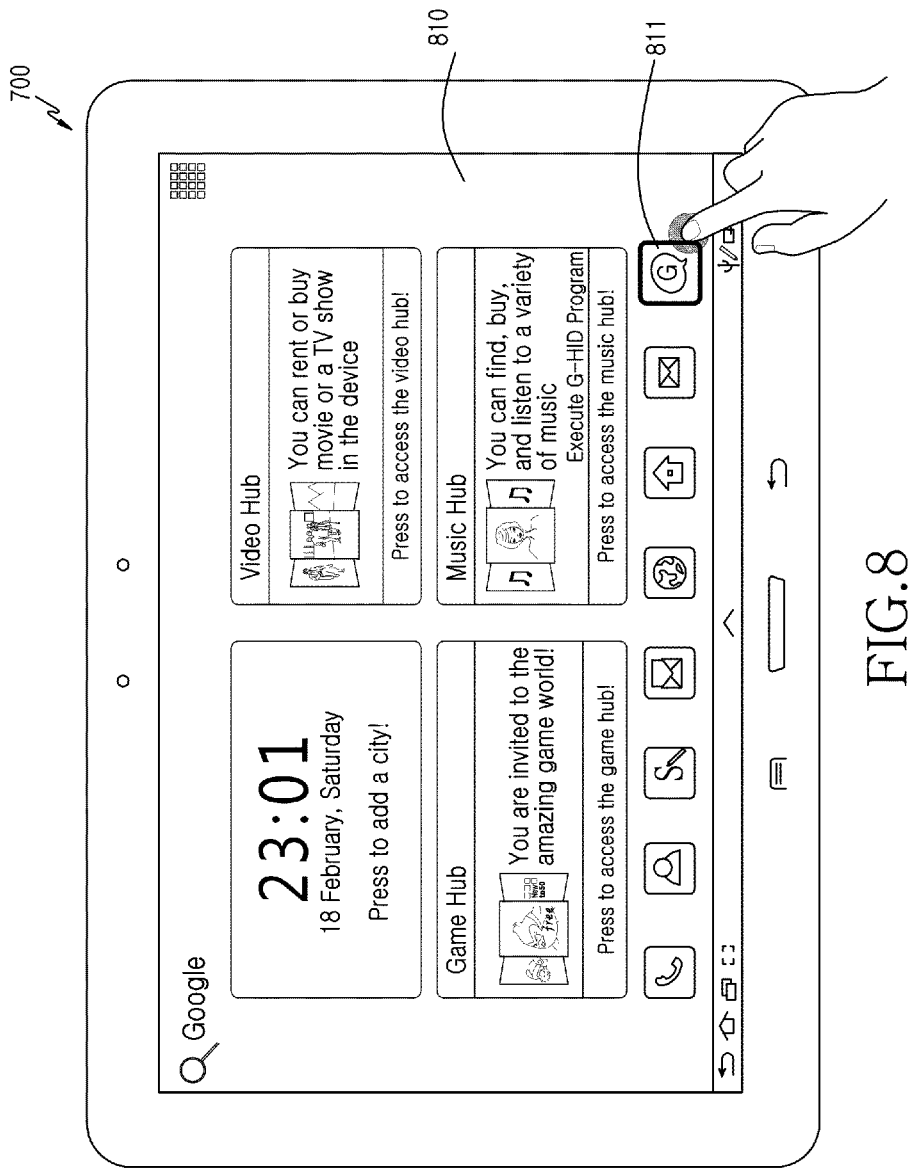
FIG. 8 illustrates a view showing a method for an electronic device to enter a screen sharing mode with another electronic device according to an exemplary embodiment of the present disclosure.
Figure 12:
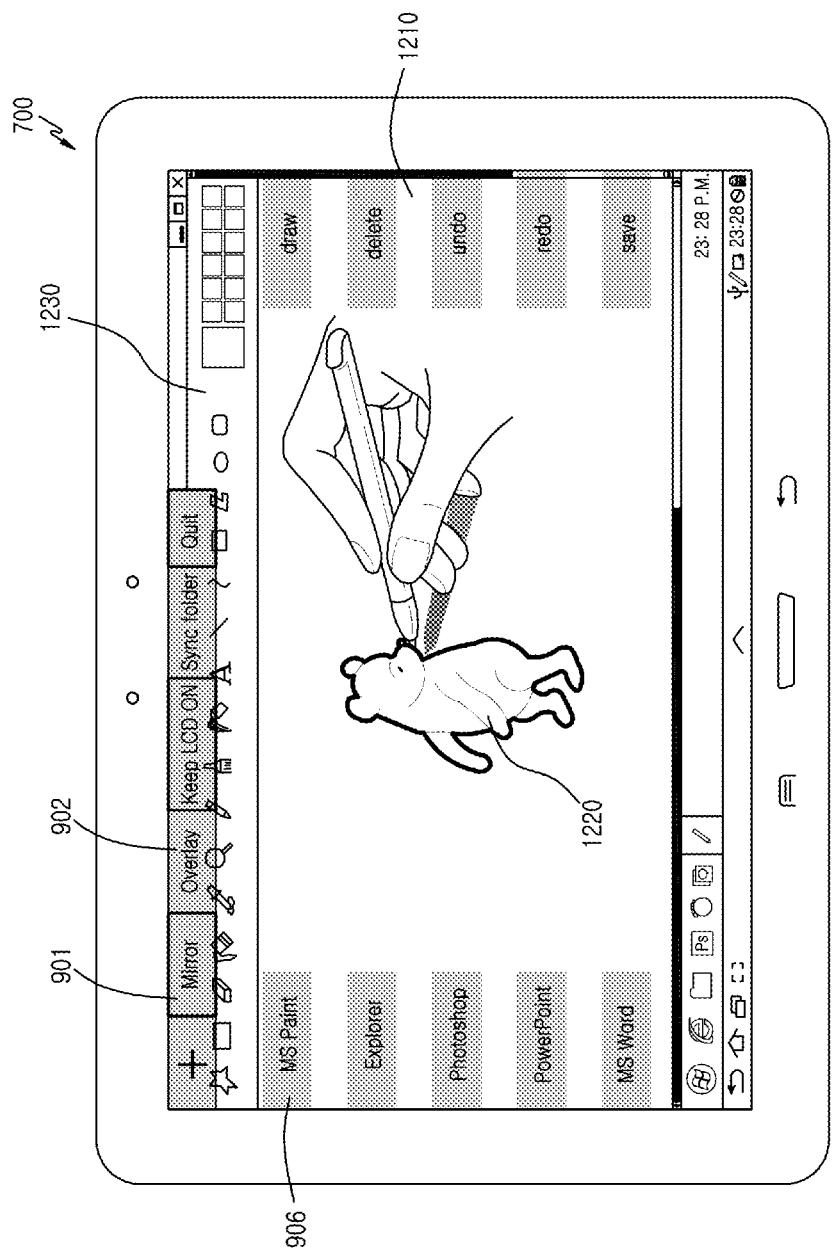
FIG. 12 illustrates a view showing a method for drawing a picture by tracing an image loaded on an electronic device according to an exemplary embodiment of the present disclosure.

According to an exemplary embodiment, the electronic device 700 may share a screen with device 710 through a screen sharing mode. For example, the electronic device 700 may enter the screen sharing mode. According to an exemplary embodiment, the electronic device 700 may display the screen of the second device 710 connected therewith, and control the second device 710 through the screen sharing mode. For example, as shown in FIG. 8, electronic device 700 may display on a basic screen 810 (or home screen), a screen sharing mode initiation icon 811 for sharing the screen with another electronic device connected therewith. According to an exemplary embodiment, a user may select the screen sharing mode initiation icon 811. With continuing reference to FIG. 4, in operation 410, the electronic device 700 may display a specific image which is excluded from the first screen shared with the connected device 710. When the user selects the screen sharing mode initiation icon 811 of FIG. 8 described above, the screen 810 of the first device 700 may change to a current screen of the connected device 710. For instance, as shown in FIG. 9, the screen 810 is shown to have changed to a substituted screen 920. In this example, the background portion (background "layer") of screen 920 is the same screen currently displayed on the connected second device 710. Additional icons 901 to 916 (discussed later) may be semi-transparently superposed over the shared screen image of the screen 920. Referring momentarily to FIG. 12, according to an exemplary embodiment, the user may select an image open ("Overlay") virtual button 902 (also shown in FIG. 9) arranged on a screen 1210 of device 700, and load a specific image 1220 stored in the device 700. (The image 1220 may be selected from a library of images in an intermediate step, not shown.) At this time, the specific image 1220 may not be displayed on the screen of the connected device 710, thus it is only displayed on the screen device 700. For example, device 700 may load and display the specific image 1220 while executing a drawing board application 906. The specific image 1220 may be displayed by being overlaid on the screen, i.e., superposed on the foreground of the shared (first) screen, of the screen 1210. The thus modified first screen is referred to herein as a "second screen". According to an exemplary embodiment, the specific image 1220 may be defined in a setting by the user and fixed according to a setting value. For example, the shared first screen (also referred to as a mirrored screen), the loaded specific image 1220, and various buttons 902, 906 related to a drawing work may be displayed on different perceptible "layers" and thus may be configured as separate overlays.

In operation 420, device 700 may share the second screen with the connected device 710 via a suitable command, such as selecting the "Mirror" icon 901.

Figure 13:
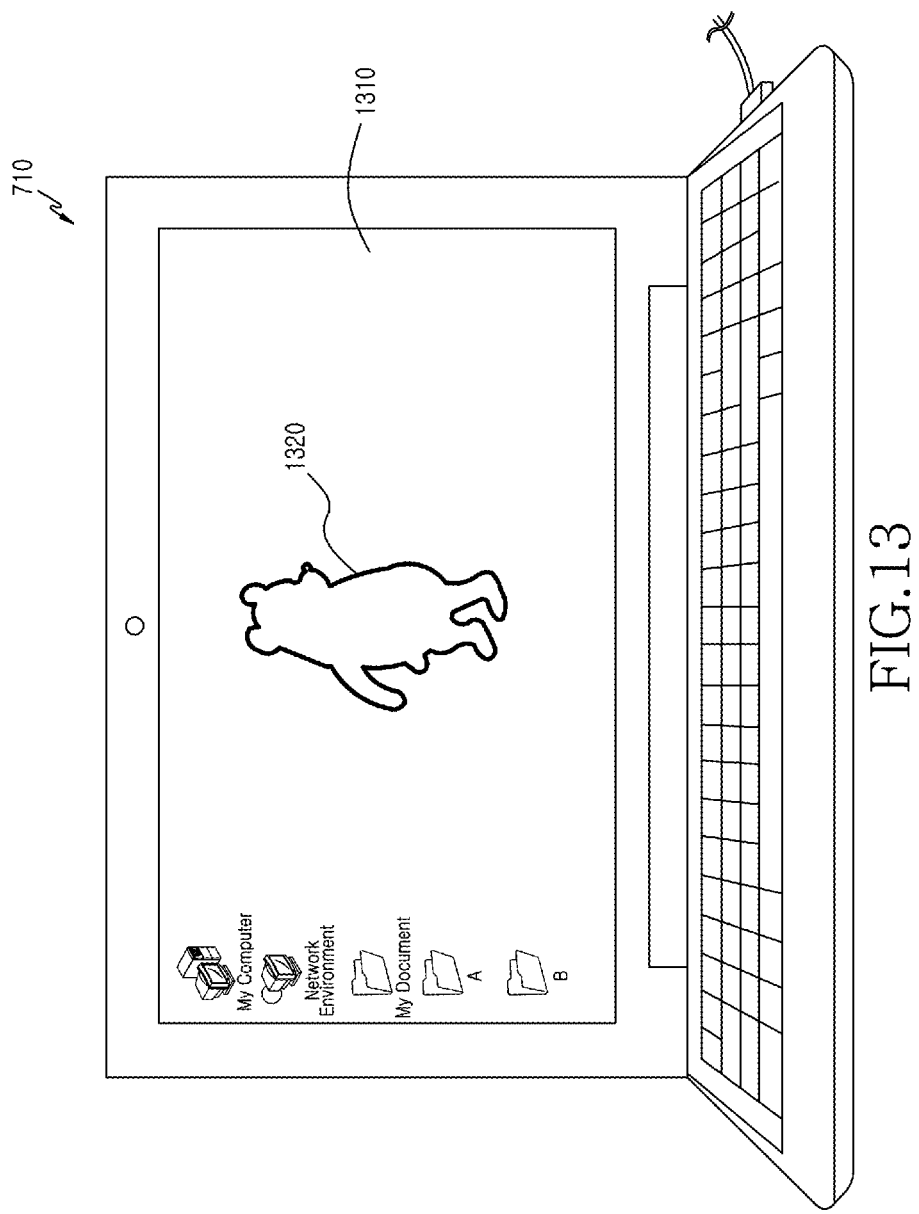
FIG. 13 illustrates a view showing a state in which a picture inputted through an electronic device is displayed on another electronic device according to an exemplary embodiment of the present disclosure.

It is further noted, the image 1220 described above may be retrieved from memory as is, or it may be customized/modified via user inputs through a drawing application, as seen in FIG. 12. According to an exemplary embodiment, the user may draw by tracing over the image 1220 displayed in the overlaying method. In addition, the user may draw various pictures using a drawing tool 1230 which is provided by the drawing board application currently executed. According to an exemplary embodiment, when the second screen is shared at operation 420, as shown in FIG. 13, a picture 1320 which is drawn in the above-described method may be shared with the connected second device 710 and displayed on a screen 1310 thereof. In other words, a drawing event inputted to the screen of device 700 as shown in FIG. 12 may be transmitted to the connected device 710. The drawing event may include data which is generated by at least one of touching, tapping, touching and holding, double tapping, touching and dragging, panning, flicking, or dragging and dropping. For example, the drawing event may be data which is transmitted separately from data seen on the screen, and may be transmitted to another electronic device 1300 as a report descriptor. The report descriptor may include a definition, an x-coordinate and a y-coordinate which are detected, and a type of a touch event. According to an exemplary embodiment, device 710, which has received the above-described report descriptor, may process the drawing event as in the state in which a digitizer is connected.

Figure 5:
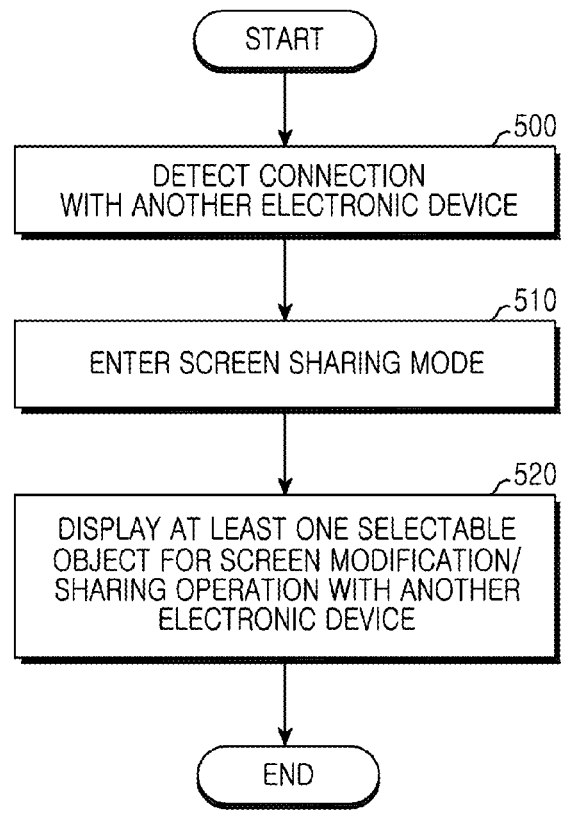
FIG. 5 is a flow chart illustrating a procedure in which an electronic device performs a specific function while sharing a screen with another electronic device according to an exemplary embodiment of the present disclosure.

FIG. 5 is a flow chart illustrating a procedure in which an electronic device performs a specific function while sharing a screen with another electronic device according to an exemplary embodiment of the present disclosure. As illustrated, in operation 500, a first electronic device 700 (see FIG. 7) may detect a connection with another (second) electronic device. As in the examples above, device 700 may be directly connected with a second electronic device 710 via any of various connection techniques (USB cable, wireless, etc.), or through a network. Device 700 may also implement enumeration handshake procedure to exchange driver information while being connected with the second device 710. For example, handshaking operations may include, when device 700 is connected with device 710 in the USB communication method, identifying what external device is connected with device 700 and exchanging driver information necessary for mutual connection.

In operation 510, device 700 may enter a screen sharing mode. According to an exemplary embodiment, device 700 may display the screen of device 710 connected therewith, and control the connected device 710 through the screen sharing mode. For example, as shown in FIG. 8, the device 700 may display on the basic screen 810 (or home screen) the screen sharing mode initiation icon 811 for sharing the screen with another electronic device connected therewith. According to an exemplary embodiment, the user may select the screen sharing mode initiation icon 811.

In operation 520, device 700 may display at least one selectable object for screen modification/sharing with device 710 connected therewith. When the user selects the screen sharing mode initiation icon 811 of FIG. 8, the screen 810 of the first device 700 may automatically change to a current screen of the connected device 710. As shown in FIG. 9, the screen 810 is shown to have changed to a substituted screen 920. According to an exemplary embodiment, a plurality of semi-transparent objects 901, 902, 903, 904, 905, 906, 907, 908, 909, 910, 911, 912, 913, 914, and 915 may be arranged on the screen 920 of device 700 at specific intervals or on specific locations. For example, the plurality of objects 901 to 915 may be displayed when a menu open button 916 marked by "+" and displayed on the screen 920 is selected. However, when the menu open button 916 is selected again, the plurality of objects 901 to 915 may not be displayed.

According to an exemplary embodiment, the specific objects 901, 902, 903, 904, and 905 may be fixed (and not movable by a user input command) in an area of the screen 920. According to an exemplary embodiment, the specific objects 901, 902, 903, 904, and 905 may include a screen mode conversion ("mirror") button 901 for converting a current screen state to a shared (mirrored) screen mode, an image open button 903 for displaying a specific image on a specific area of the display 920, a screen brightness maintenance button 903 for maintaining the screen brightness of the display 920, a file loading button 904 for loading a file stored in another electronic device connected with device 700, and an end button 905 for ending the screen sharing mode.

According to an exemplary embodiment, when the screen mode conversion ("mirror") button 901 is selected, the electronic device 700 may convert a current mode to a mirrored screen mode (or a duplication screen mode) to display the same screen as displayed on another electronic device connected therewith on the screen 920. In another embodiment or menu option, the conversion ("mirror") button 901 may initiate an extension screen mode to extend a part of the screen displayed on the connected electronic device 710, so that the part of the screen displayed on the connected device 710 is displayed on the display 920. Other screen modes are also possible. For instance, the conversion button 910 may instead cause the current screen 920 of device 700 to be displayed on the connected device 710.

According to various exemplary embodiments, when the image open ("overlay") button 902 is selected, the electronic device 700 may load a specific image stored in the electronic device 700 (e.g., image 1120 shown in FIGS. 1A-11D). According to an exemplary embodiment, the electronic device 700 may display the specific image by overlaying the image on the screen. The user may modify this image by drawing on or around the image or by tracing the overlaid image, and modified image thus drawn may be transmitted to another electronic device. According to an exemplary embodiment, the modified image in the overlaying method in the electronic device 900 may be transmitted to the connected device 710 through a USB gadget driver, or wirelessly, etc. According to various exemplary embodiments, an endpoint for mirroring the screen of another electronic device and an endpoint for transmitting the picture drawn in the overlaying method to another electronic device may be separately configured. In other words, an initial screen may first be mirrored such that both the connected devices 700 and 710 display the same (first) screen. Thereafter, while remaining in a "quasi screen sharing mode," the user of device 710 may edit the first screen by superposing a specific image and/or drawing on the shared first screen, thereby generating a second screen that is only visible at this time on the first device 700. When the user of device 700 has completed the editing, the user may input a "sharing" command to cause the second screen to be transmitted to the second device 710, thereby sharing the edited first screen (i.e., the second screen.)

In an embodiment variant, instead of loading a specific image stored in device 700 to edit the first screen, the electronic device 700 may load an image stored in the connected device 710. For example, the electronic device 700 may select an image stored in device 710 in a suitable pull up menu, and display the selected image by overlaying the image on the screen 920. According to an exemplary embodiment, the displayed image may be defined in a setting menu by the user and fixed according to a setting value. For example, the shared screen (mirrored screen), the display image, or various buttons related to the drawing work may be displayed on different layers and thus may be configured as separate overlays.

According to various exemplary embodiments, when the screen brightness maintenance button 903 is selected, the electronic device 700 may set the screen of the display 920 not to be turned off even when a predetermined time elapses. For example, the electronic device 700 may maintain the current screen brightness of the display 920.

According to various exemplary embodiments, when the file loading button 904 is selected, the electronic device 900 may load various kinds of files stored in another electronic device connected therewith. For example, the electronic device 700 may load a music file, a picture file, a moving image file, a text file or a specific application of another electronic device.

According to various exemplary embodiments, when the end button 905 is selected, the electronic device 700 may end the screen sharing mode with another electronic device and may display the original screen of the electronic device 700.

According to an exemplary embodiment, the specific objects 906, 907, 908, 909, 910, 911, 912, 913, 914, and 915 may be arranged variably within an area of the display 920. According to an exemplary embodiment, the specific objects 906, 907, 908, 909, 910, 911, 912, 913, 914, and 915 may include application execution buttons 906, 907, 908, 909, and 910 for executing applications of another electronic device connected with the electronic device 700 and key input buttons 911, 912, 913, 914, and 915 for performing specific functions.

According to an exemplary embodiment, the application execution buttons 906, 907, 908, 909, and 910 may include a drawing board application 906, an internet application 907, a Photoshop application 908, a PowerPoint application 909, and a Word application 910, which are stored in another electronic device. In other embodiments, the application execution buttons 906, 907, 908, 909, and 910 may include various other application execution buttons for executing various other applications stored in the connected electronic device 710.

According to an exemplary embodiment, the key input buttons 911, 912, 913, 914, and 915 may include or may be mapped onto shortcut key or command functions which are frequently used. According to an exemplary embodiment, the key input buttons 911, 912, 913, 914, and 915 may include shortcut key or command functions which are used in another electronic device. For example, the key input buttons 911, 912, 913, 914, and 915 may include a drawing function 911 for a drawing work, a delete function 912, an undo function 913, a redo function 914, and a save function 915. Virtual buttons for other functions are also possible. The key input buttons 911, 912, 913, 914, and 915 may include various key input buttons including shortcut key or command functions for a specific work.

Figure 10A:
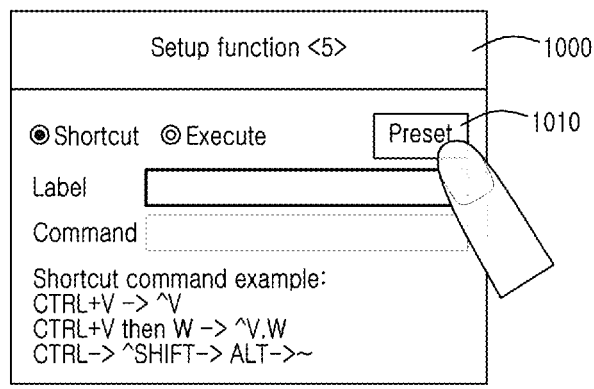
FIG. 10A, FIG. 10B and FIG. 10C illustrate a view showing a screen in a state in which an electronic device shares a screen according to an exemplary embodiment of the present disclosure.
Figure 10B:
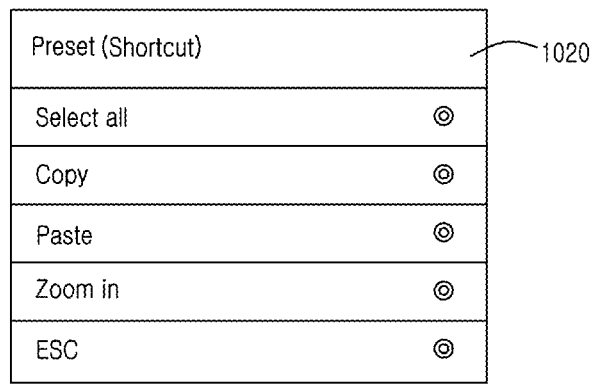
Figure 10C:
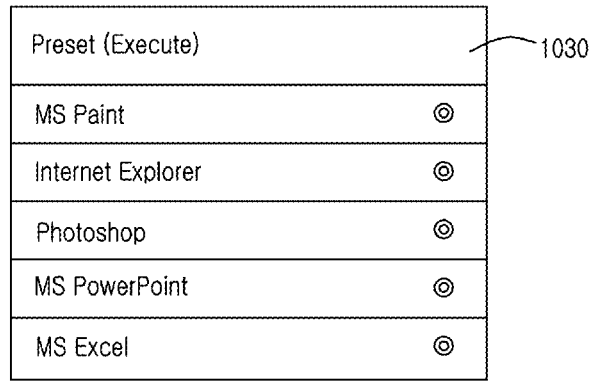

According to various exemplary embodiments, the above-described application execution buttons 906, 907, 908, 909, and 910 or the key input buttons 911, 912, 913, 914, and 915 may be set by the user. For example, referring to FIG. 10A, the electronic device 700 may designate a shortcut key for executing a specific application or a shortcut key for performing a specific function through a function setting window 1000 of device 700. According to an exemplary embodiment, the electronic device may display a setting button 1010 and receive selection of various functions through a function list window 1020 as shown in FIG. 10B, and may receive selection of various applications through an application list window 1030 as shown in FIG. 10C. In other designs, various other applications or functions which can be added by the user may be provided in addition to the applications or functions shown in FIGS. 10A-10C.

Figure 6:
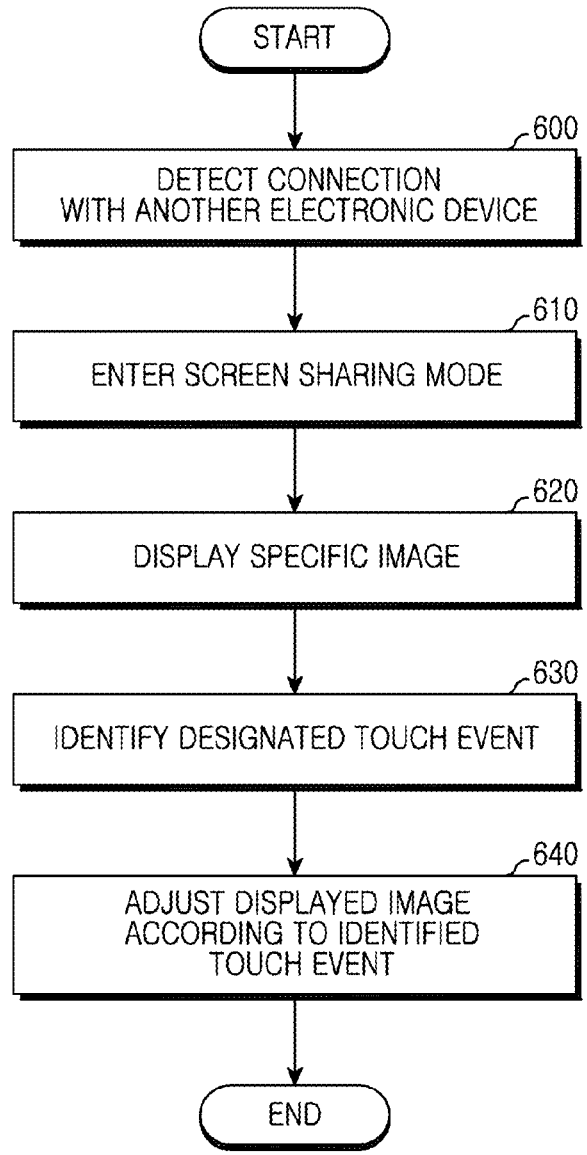
FIG. 6 is a flow chart illustrating a procedure in which an electronic device performs a specific function while sharing a screen with another electronic device according to an exemplary embodiment of the present disclosure.

FIG. 6 is a flow chart showing a procedure in which an electronic device performs a specific function while sharing a screen with another electronic device according to an exemplary embodiment of the present disclosure. As shown in FIG. 6, operations 600 and 610 involve device 700 detecting connection with another device 710 and entering a screen sharing mode. These operations may be the same as operations 500 and 510, respectively, of FIG. 5, thus redundant description thereof is omitted.

In operation 620, the electronic device 700 may display a specific image. When the above-described screen sharing mode initiation icon 811 is selected, the current screen 810 may be substituted with the screen of the connected device 710, thus generating the screen 920 as shown in FIG. 9.

Figure 11A:
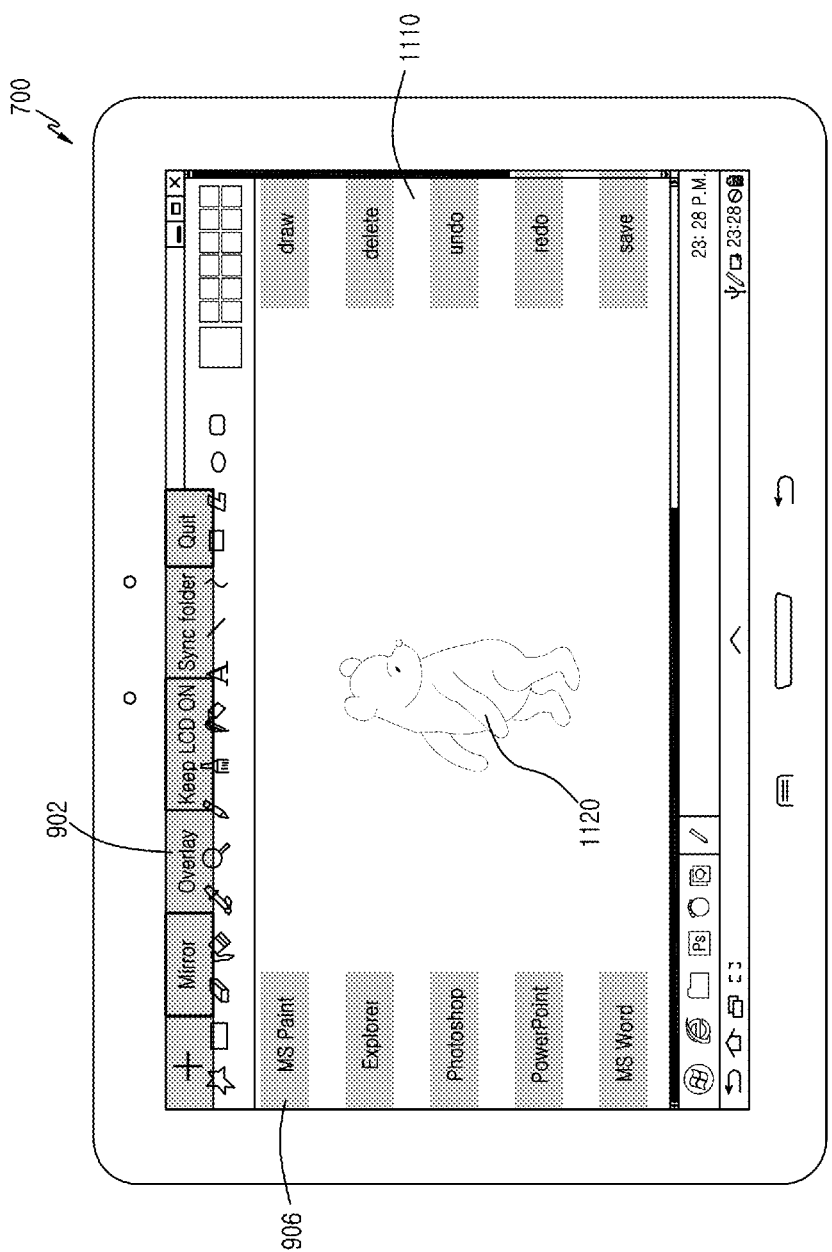

According to an exemplary embodiment, as shown in FIG. 11A, when the image initiation ("overlay") button 902 is selected, a specific image 1120 stored in device 700 may be loaded and displayed. For example, the electronic device 700 may load and display the specific image 1120 while executing a drawing board application launched via selection of associated icon 906. (The specific image may be selected from a library of images suitably displayed while the drawing board application runs.) The specific image 1120 may be displayed by being overlaid on the screen of the display 1110. In an example, the user may draw a picture by tracing over the overlaid image 1120, and the picture drawn in this method may be transmitted to another electronic device (e.g., the connected device 710).

In operation 630, the electronic device 700 may identify a designated touch event. According to an exemplary embodiment, device 700 may identify at least one of touching, tapping, touching and holding, double tapping, touching and dragging, panning, flicking, or dragging and dropping, which are performed by the user's finger or other touch implement.

Figure 11B:
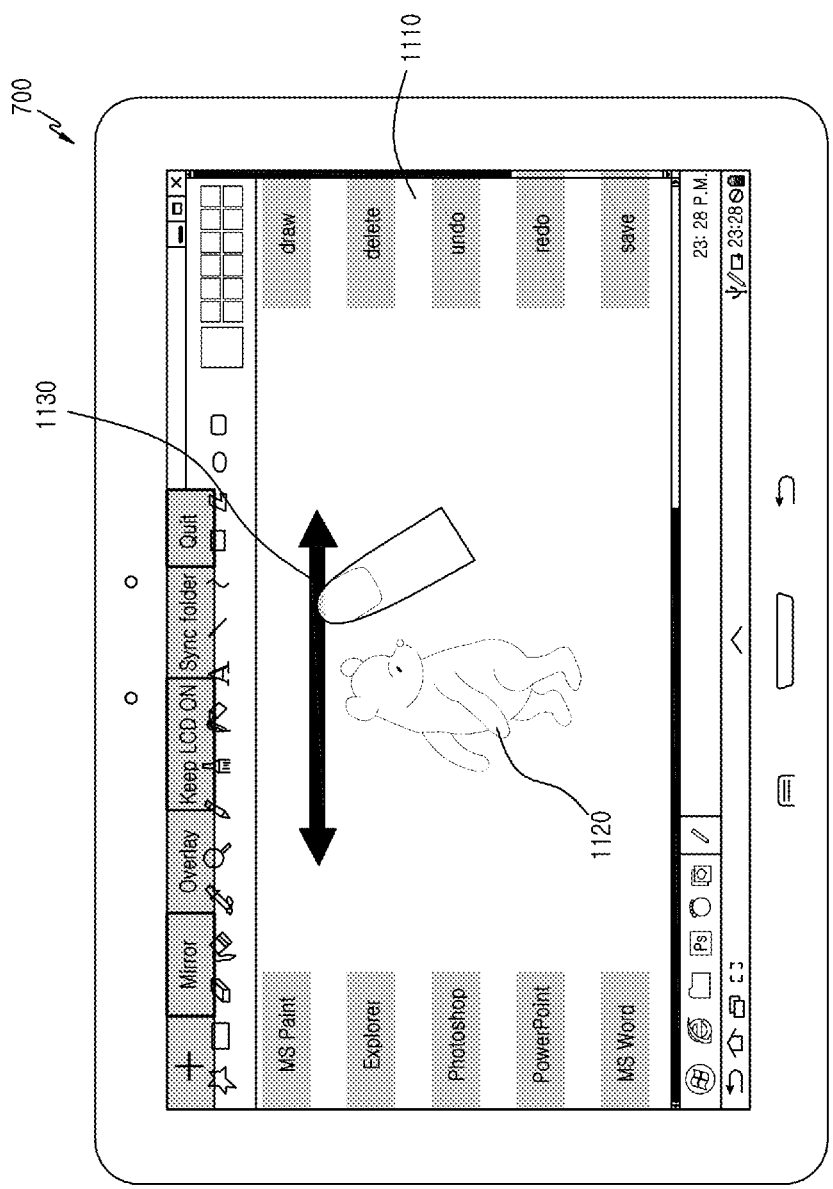

In operation 640, the electronic device 700 may adjust the displayed image according to the identified touch event. According to various exemplary embodiments, as shown in FIG. 11B, the electronic device 700 may adjust the transparency of the image 1120 displayed on the screen 1110 by horizontally dragging on the image 1120. For example, when the dragging in the leftward direction is detected, the transparency of the displayed image 1120 may gradually decrease, and, when the dragging in the rightward direction is detected, the transparency of the displayed image 1120 may gradually increase. The reverse operation is possible.

Figure 11C:
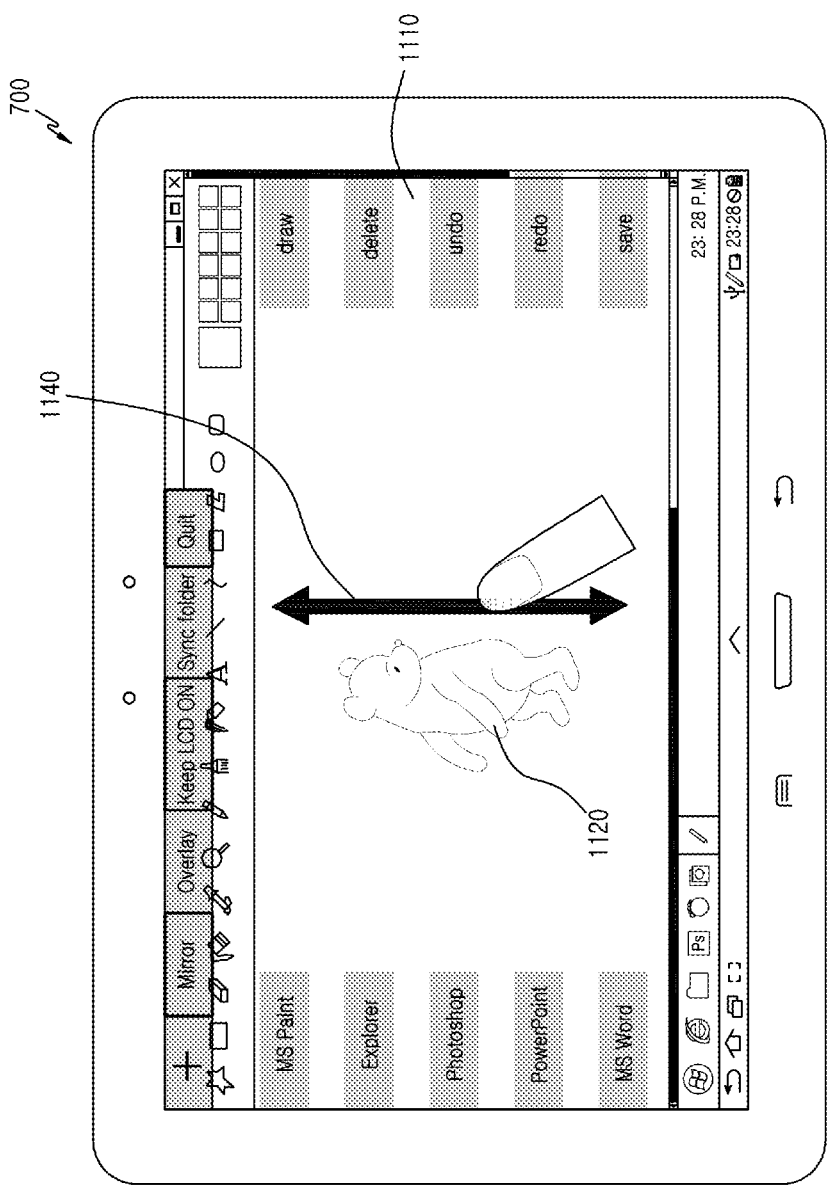

According to various exemplary embodiment, as shown in FIG. 11C, the electronic device 700 may adjust the intensity of the filter of the image 1120 displayed on the screen 1110 by vertically dragging 1140 on the image 1120. For example, when the dragging in the downward direction is detected, the intensity of the filter of the displayed image 1120 may gradually decrease, and, when the dragging in the upward direction is detected, the intensity of the filter of the displayed image 1120 may gradually increase. The reverse operation is possible.

According to various exemplary embodiments, when the image 1120 is loaded on the screen 1110, the electronic device 700 may additionally display an image control button 1150 (also referred to as a "control object" or just "object") as shown in FIG. 11D. For example, the electronic device 700 may adjust the location of the displayed image 1120 or apply a specific filter effect to the image 1120 through the image control button 1150. According to an exemplary embodiment, when the user moves the image control button 1150 in one of upward, downward, leftward, and rightward directions by dragging, the displayed image 1120 may be moved in the same direction as the image control button 1150 moves or in proportion to the movement of the image control button 1150. According to an exemplary embodiment, when the user selects the image control button 1150, the electronic device may select various filter effects to be applied to the displayed image 1120. For example, the filter effect may include an edge effect for extracting and showing only the edge of an image, a black and white effect for showing an image in black and white, a sketch effect for showing an image as if the image is sketched with a pencil, a sharpening effect for sharpening a burred part of an image, and the like. According to an exemplary embodiment, the electronic device 700 may provide a stamp function for providing contour lines extracted from the edge of an image to another electronic device. However, this should not be considered as limiting and the electronic device 1100 may further provide various filter effects for the displayed image.

According to various exemplary embodiments of the present disclosure, a method for operating a first electronic device may include communicating with another (second) electronic device and sharing a first screen, displaying a specific image which is excluded from the first screen shared with the second electronic device on a created second screen (i.e., an edited version of the first screen); and sharing the second screen with the other (second) electronic device, or with yet another electronic device.

According to various exemplary embodiments, the communicating with the second electronic device may include connecting with another electronic device in a USB method or a wireless communication method.

According to various exemplary embodiments, the communicating with another electronic device may include performing a handshake to exchange driver information for mutual connection with the second electronic device.

According to various exemplary embodiments, the sharing of the first screen may entail displaying the same screen as that currently displayed on the second electronic device, on the screen of the first device, or, displaying a screen which is extended from a part of the current screen of the second device on the screen of the device.

According to various exemplary embodiments, the displaying of the specific image may include loading at least one of an image which is stored in the first device or an image which is stored in the second device.

According to various exemplary embodiments, the displaying of the specific image may include displaying the specific image by overlaying the specific image on the screen of the first electronic device (e.g. superposing the specific image on a background layer of the first screen).

According to various exemplary embodiments, the method may further include identifying a touch event associated with the specific image, and adjusting the specific image according to the touch event.

According to various exemplary embodiments, the adjusting of the specific image may include adjusting at least one of transparency of the specific image or an intensity of a filter of the specific image according to inputted dragging.

According to various exemplary embodiments, the adjusting of the specific image may include displaying a control object related to the specific image and moving the specific image according to the movement of the control object.

According to various exemplary embodiments, the adjusting the specific image may include applying a filter effect to the specific image.

According to various exemplary embodiments, the method may further include displaying at least one object which is mapped onto at least one of an application, a shortcut key, or a command related to the connected second electronic device.

According to various exemplary embodiments, at least one of the application, the shortcut key, or the command may be set by a user.

According to various exemplary embodiments, the sharing the screen created based on the specific image with another electronic device may include transmitting at least one drawing event which is generated in association with the specific image to the second electronic device as a report descriptor.

Figure 14:
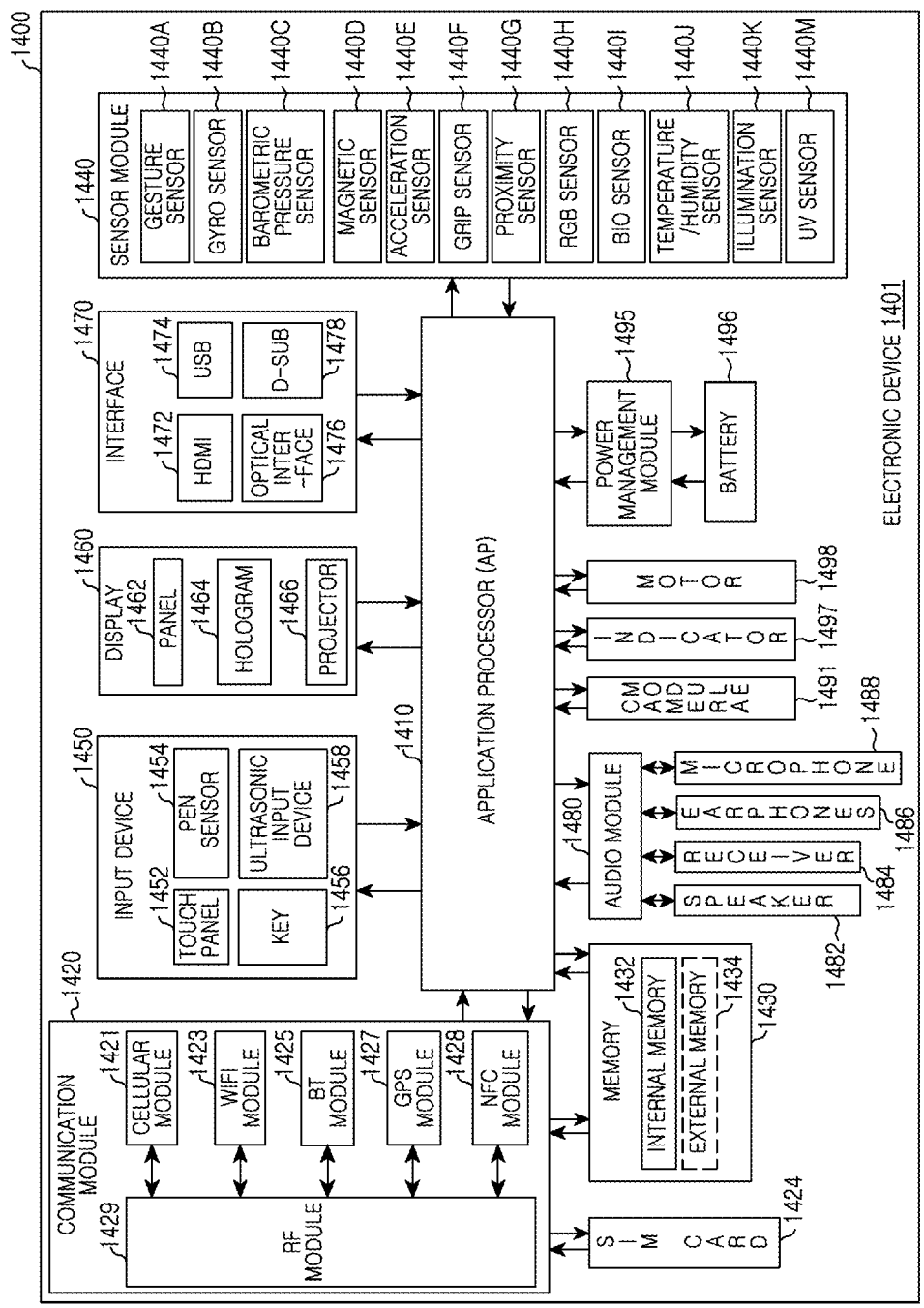
FIG. 14 illustrates a block diagram showing an electronic device according to various exemplary embodiments of the present disclosure.

FIG. 14 illustrates a block diagram 1400 of an electronic device 1401 according to various exemplary embodiments of the present disclosure. The electronic device 1401 may configure the entirety or part of the electronic device 100 shown in FIG. 1, or the devices 700 and/or 710 of FIG. 7.

Referring to FIG. 14, the electronic device 1401 may include one or more Application Processors (APs) 1410, a communication module 1420, a Subscriber Identification Module (SIM) card 1424, a memory 1430, a sensor module 1440, an input device 1450, a display 1460, an interface 1470, an audio module 1480, a camera module 1491, a power management module 1495, a battery 1496, an indicator 1497, or a motor 1498.

The AP 1410 may control a plurality of hardware or software elements connected to the AP 1410 by driving an operating system or an application program, and may process and calculate a variety of data including multimedia data. For example, the AP 1410 may be implemented by using a System on Chip (SoC). According to an exemplary embodiment, the AP 1410 may further include a Graphic Processing Unit (GPU) (not shown).

The communication module 1420 may transmit and receive data via communication between the electronic device 1401 (for example, the electronic device 100) and other electronic devices (for example, the electronic device 102 or 104 or the server 106) connected through a network. According to an exemplary embodiment, the communication module 1420 may include a cellular module 1421, a WiFi module 1423, a BT module 1425, a GPS module 1427, an NFC module 1428, and a Radio Frequency (RF) module 1429.

The cellular module 1421 may provide a voice call, a video call, a text service, or an internet service through a telecommunications network (for example, LTE, LTE-A, CDMA, WCDMA, UMTS, WiBro, GSM, and the like). In addition, the cellular module 1421 may identify and authenticate the electronic device in the telecommunications network by using a subscriber identification module (for example, the SIM card 1424). According to an exemplary embodiment, the cellular module 1421 may perform at least some of the functions provided by the AP 1410. For example, the cellular module 1421 may perform at least some of the multimedia control functions.

According to an exemplary embodiment, the cellular module 1421 may include a Communication Processor (CP). In addition, the cellular module 1421 may be implemented by using a SoC, for example. In FIG. 14, the cellular module 1421 (for example, the communication processor), the memory 1430, or the power management module 1495 are elements separate from the AP 1410. However, according to an exemplary embodiment, the AP 1410 may be configured to include at least some of the above-described elements (for example, the cellular module 1421).

According to an exemplary embodiment, the AP 1410 or the cellular module 1421 (for example, the communication processor) may load instructions or data received from a non-volatile memory connected therewith or at least one of the other elements into a volatile memory, and may process the instructions or data. In addition, the AP 1410 or the cellular module 1421 may store data which is received from at least one of the other elements or generated by at least one of the other elements in the non-volatile memory.

The WiFi module 1423, the BT module 1425, the GPS module 1427, or the NFC module 1428 each may include a processor for processing data received and transmitted through a corresponding module. In FIG. 14, the cellular module 1421, the WiFi module 1423, the BT module 1425, the GPS module 1427, or the NFC module 1428 is illustrated in a separate block. However, according to an exemplary embodiment, at least some (for example, two or more) of the cellular module 1421, the WiFi module 1423, the BT module 1425, the GPS module 1427, or the NFC module 1428 may be included in a single integrated chip (IC) or a single IC package. For example, at least some of the processors corresponding to the cellular module 1421, the WiFi module 1423, the BT module 1425, the GPS module 1427, and the NFC module 1428 (for example, the communication processor corresponding to the cellular module 1421 and the WiFi processor corresponding to the WiFi module 1423) may be implemented by using a single SoC.

The RF module 1429 may transmit and receive data, for example, may transmit and receive an RF signal. Although not shown, the RF module 1429 may include a transceiver, a Power Amp Module (PAM), a frequency filter, or a Low Noise Amplifier (LNA), for example. In addition, the RF module 1429 may further include a part for exchanging electromagnetic waves in a free space in wireless communication, for example, a conductor or conducting wire. In FIG. 14, the cellular module 1421, the WiFi module 1423, the BT module 1425, the GPS module 1427, and the NFC module 1428 share the single RF module 1429 with one another. However, according to an exemplary embodiment, at least one of the cellular module 1421, the WiFi module 1423, the BT module 1425, the GPS module 1427, or the NFC module 1428 may transmit and receive an RF signal through a separate RF module.

The SIM card 1424 may be a card including a subscriber identification module, and may be inserted into a slot formed on a specific location of the electronic device. The SIM card 1424 may include unique identification information (for example, an Integrated Circuit Card Identifier (ICCID)) or subscriber information (for example, International Mobile Subscriber Identity (IMSI)).

The memory 1430 (for example, the memory 130) may include an internal memory 1432 or an external memory 1434. For example, the internal memory 1432 may include at least one of a volatile memory (for example, a Dynamic Random Access Memory (DRAM), a Static Random Access Memory (SRAM), a Synchronous DRAM (SDRAM), and the like) and a non-volatile memory (for example, an One-Time Programmable Read Only Memory (OTPROM), a Programmable Read Only Memory (PROM), an Erasable Programmable Read Only Memory (EPROM), an Electrically Erasable Programmable Read Only Memory (EEPROM), a mask ROM, a flash ROM, a NAND flash memory, a NOR flash memory, and the like).

According to an exemplary embodiment, the internal memory 1432 may be a Solid State Drive (SSD). The external memory 1434 may further include a flash drive, for example, Compact Flash (CF), Secure Digital (SD), Micro-SD, Mini-SD, extreme-Digital (xD), a memory stick, and the like. The external memory 1434 may be functionally connected with the electronic device 1401 through various interfaces. According to an exemplary embodiment, the electronic device 1401 may further include a storage device (or a storage medium) such as a hard drive.

The sensor module 1440 may measure a physical quantity or detect an operation state of the electronic device 1401, and may convert measured or detected information into electric signals. The sensor module 1440 may include at least one of a gesture sensor 1440A, a gyro sensor 1440B, a barometric pressure sensor 1440C, a magnetic sensor 1440D, an acceleration sensor 1440E, a grip sensor 1440F, a proximity sensor 1440G, a color sensor 1440H (e.g., Red, Green, Blue (RGB) sensor), a biosensor 1440I, a temperature/humidity sensor 1440J, an illumination sensor 1440K, and a Ultraviolet (UV) sensor 1440M. Additionally or alternatively, the sensor module 1440 may include an E-nose sensor (not shown), an electromyography (EMG) sensor (not shown), an electroencephalogram (EEG) sensor (not shown), an electrocardiogram (ECG) sensor (not shown), an infrared ray (IR) sensor, an iris sensor (not shown), a fingerprint sensor (not shown), and the like. The sensor module 1440 may further include a control circuit to control at least one sensor included therein.

The input device 1450 may include a touch panel 1452, a (digital) pen sensor 1454, a key 1456, or an ultrasonic input device 1458. The touch panel 1452 may recognize a touch input in at least one method of capacitive, resistive, infrared, and ultrasonic methods. In addition, the touch panel 1452 may further include a control circuit (not shown). In the embodiment of a capacitive method, the touch panel 1452 may recognize physical contact or hovering. The touch panel 1452 may further include a tactile layer. In this embodiment, the touch panel 1452 may provide a tactile response to the user.

The (digital) pen sensor 1454 may be implemented in the same or similar method as or to the method of receiving a user's touch input or by using a separate detection sheet. The key 1456 may include a physical button, an optical key, or a keypad. The ultrasonic input device 1458 allows the electronic device 1401 to detect sound waves through a microphone (for example, the microphone 1488) through an input device generating ultrasonic signals, and is capable of wireless recognition. According to an exemplary embodiment, the electronic device 1401 may receive a user input from an external device connected thereto (for example, a computer or a server) by using the communication module 1420.

The display 1460 may include a panel 1462, a hologram device 1464, or a projector 1466. For example, the panel 1462 may be a Liquid Crystal Display (LCD) or an Active Matrix Organic Light Emitting Diode (AM-OLED). For example, the panel 1462 may be implemented to be flexible, transparent, or wearable. The panel 1462 may be configured as a single module along with the touch panel 1452. The hologram device 1464 may show a stereoscopic image in the air using interference of light. The projector 1466 may display an image by projecting light onto a screen. The screen may be located inside or outside the electronic device 1401. According to an exemplary embodiment, the display 1460 may further include a control circuit to control the panel 1462, the hologram device 1464, or the projector 1466.

The interface 1470 may include a High Definition Multimedia Interface (HDMI) 1472, a Universal Serial Bus (USB) 1474, an optical interface 1476, or D-subminiature (sub) 1478. The interface 1470 may be included in the communication interface 160 shown in FIG. 1. Additionally or alternatively, the interface 1470 may include a Mobile High Definition Link (MHL) interface, a Secure Digital (SD) card/Multimedia Card (MMC) interface or Infrared Data Association (IrDA) standard interface.

The audio module 1480 may convert a sound and an electric signal bidirectionally. The audio module 1480 may process sound information which is inputted or outputted through a speaker 1482, a receiver 1484, an earphone 1486, or a microphone 1488.

The camera module 1491 is a device for photographing a still image and a moving image, and, according to an exemplary embodiment, the camera module 1491 may include one or more image sensors (for example, a front surface sensor or a rear surface sensor), a lens (not shown), an Image Signal Processor (ISP) (not shown), or a flash (memory) (for example, a Light Emitting Diode (LED) or a xenon lamp).

The power management module 1495 may manage power of the electronic device 1401. Although not shown, the power management module 1495 may include a Power Management IC (PMIC), a charging IC, or a battery or fuel gage. For example, the PMIC may be mounted in an integrated circuit or a SoC semiconductor.

The charging method may be a wire charging method or a wireless charging method. The charging IC may charge a battery and may prevent inflow of overvoltage or over current from a charger. According to an exemplary embodiment, the charging IC may include a charging IC for at least one of the wire charging method and the wireless charging method. The wireless charging method may include a magnetic resonance method, a magnetic induction method, or an electromagnetic wave method, and an additional circuit for charging wirelessly, for example, a circuit such as a coil loop, a resonant circuit, a rectifier, and the like may be added.

For example, the battery gage may measure a remaining battery life of the battery 1496, a voltage, a current, or temperature during charging. The battery 1496 may store or generate electricity and may supply power to the electronic device 1401 by using stored or generated electricity. The battery 1496 may include a rechargeable battery or a solar battery.

The indicator 1497 may display a specific state of the electronic device 1401 or a part of it (for example, the AP 1410), for example, a booting state, a message state, or a charging state. The motor 1498 may convert an electric signal into a mechanical vibration. Although not shown, the electronic device 1401 may include a processing device (for example, a GPU) for supporting a mobile TV. The processing device for supporting the mobile TV may process media data according to standards such as Digital Multimedia Broadcasting (DMB), Digital Video Broadcasting (DVB), or media flow.

Each of the above-described elements of the electronic device according to various exemplary embodiments of the present disclosure may be comprised of one or more components, and the names of the elements may vary according to the kind of the electronic device. The electronic device according to various exemplary embodiments of the present disclosure may include at least one of the above-described elements, and some of the elements may be omitted or an additional element may be further included. In addition, some of the elements of the electronic device according to various exemplary embodiments of the present disclosure may be combined into a single entity, and may perform the same functions as those of the elements before being combined.

The term "module" used in various exemplary embodiments of the present disclosure refers to a unit including one of hardware, software, and firmware, or a combination of two or more of them, for example. For example, the "module" may be used interchangeably with terms like unit, logic, logical block, component or circuit. The "module" may be a minimum unit of an integrally configured part or a part of it. The "module" may be a minimum unit that performs one or more functions or a part of it. The "module" may be implemented mechanically or electronically. For example, the "module" according to various exemplary embodiments of the present disclosure may include at least one of an Application Specific Integrated Circuit (ASIC) chip, Field Programmable Gate Arrays (FPGAs), and a programmable logic device which perform any operation that is already well known or will be developed in the future.

According to various exemplary embodiments, at least part of the apparatus (for example, modules or functions) or method (for example, operations) according to various exemplary embodiments of the present disclosure may be implemented by using instructions stored in a computer-readable storage medium in the form of a programming module. When the instructions are executed by one or more processors (for example, the processor 120), the one or more processors may perform a function corresponding to the instructions. The computer-readable storage medium may be the memory 130, for example. At least part of the programming module may be implemented (for example, executed) by using the processor 120. At least part of the programming module may include a module, a program, a routine, sets of instructions, a process, and the like for performing one or more functions.

Examples of the computer-readable recording medium include magnetic media such as hard disks, floppy disks and magnetic tapes, optical media such as Compact Disc Read Only Memories (CD-ROMs) and Digital Versatile Disc (DVDs), magneto-optical media such as floptical disks, and hardware devices such as Read Only Memories (ROMs), Random Access Memories (RAMs) and flash memories that are especially configured to store and execute program commands (for example, the programming module). Examples of the program commands include machine language codes created by a compiler, and high-level language codes that can be executed by a computer by using an interpreter. The above-described hardware devices may be configured to operate as one or more software modules for performing operations of various exemplary embodiment of the present disclosure, and vice versa.

A module or programming module according to various exemplary embodiments of the present disclosure may include one or more of the above-described elements, may omit some elements, or may further include additional elements. The operations performed by the module, the programming module, or the other elements according to various exemplary embodiments of the present disclosure may be performed serially, in parallel, repeatedly, or heuristically. In addition, some operation may be performed in different order or may omitted, and an additional operation may be added.

According to various exemplary embodiments, the instructions stored in the storage medium may be set to allow at least one processor to perform at least one operation when the instructions are executed by the at least one processor, and the at least one operation may include: communicating, by a first electronic device, with a second electronic device and sharing a first screen; displaying a specific image which is excluded from the first screen shared with the second electronic device on a screen; and sharing a created second which includes the specific image with the second electronic device.

As described above, the present disclosure provides an intuitive user interface (UI) enabling a user of a first device to initially share a first screen with a second device, revise the first screen at the first device by incorporating a retrieved and/or electronically drawn (non-textual) image without initially revealing the revisions to the second device user, and quickly transmit the revised first screen (as a second screen) to the second device in an updated sharing operation.

While certain illustrative embodiments have been described, it will be understood by those skilled in the art that various changes in form and details may be made therein without departing from the spirit and scope of the invention as defined by the appended claims. Therefore, the scope of the invention is defined not by the detailed description hereinabove but by the appended claims, and all differences within the scope will be construed as being encompassed by the present invention.

What is claimed is:

1. A method performed by a first electronic device, the method comprising:
communicating with a second electronic device via a communication connection;
displaying by the first electronic device, a first screen identical to a second screen being displayed in the second electronic device;
displaying a first image superposed on the first screen, wherein the first image is not displayed in the second electronic device;
displaying a second image drawn by a user touch input, wherein the second image is displayed to be superposed on the first image; and
sharing the second image with the second electronic device in a real time such that the second electronic device displays the second image to be superposed on the second screen.

2. The method of claim 1, wherein the communication connection is a USB connection or a direct wireless connection between the first and second electronic devices.

3. The method of claim 1, wherein the communicating with the second electronic device comprises performing handshaking to exchange driver information for mutual connection with the second electronic device.

4. The method of claim 1, further comprising loading the first image which is stored in the first electronic device.

5. The method of claim 1, further comprising loading the first image which is stored in the second electronic device.

6. The method of claim 1, wherein the sharing the second image comprises transmitting at least one drawing event which is generated associated with the first image to the second electronic device as a report descriptor.

7. The method of claim 1, further comprising displaying at least one object which is mapped onto at least one of an application, a shortcut key, or a command for screen sharing with the second electronic device.

8. The method of claim 7, wherein at least one of the application, the shortcut key, or the command is set by a user.

9. The method of claim 1, further comprising:
identifying a touch event associated with the first image; and
adjusting the first image according to the touch event.

10. The method of claim 9, wherein the adjusting the first image comprises adjusting at least one of transparency of the first image or an intensity of a filter of the first image according to inputted dragging.

11. The method of claim 9, wherein the adjusting the first image comprises displaying a control object related to the first image and moving the first image according to movement of the control object.

12. The method of claim 9, wherein the adjusting the first image comprises applying a filter effect to the first image.

13. A first electronic device comprising:
a communication module;
a display functionally connected with the communication module; and
a processor configured to:
communicate with a second electronic device via a communication connection,
control the display to display, using the display, a first screen identical to a second screen being displayed in the second electronic device;
control the display to display a first image superposed on the first screen, wherein the first image is not displayed in the second electronic device;
control the display to display a second image drawn by a user touch input, wherein the second image is displayed to be superposed on the first image; and
control the communication module to share the second image with the second electronic device in a real time such that the second electronic device displays the second image to be superposed on the second screen.

14. The electronic device of claim 13, wherein the processor is configured to control the display to display at least one object which is mapped onto at least one of an application, a shortcut key, or a command for screen sharing with the second electronic device.

15. The electronic device of claim 13, wherein the processor is configured to identify a touch event associated with the first image, and adjust the first image according to the touch event.

16. The electronic device of claim 15, wherein the processor is configured to adjust at least one of transparency of the first image or an intensity of a filter of the first image according to inputted dragging.

17. The electronic device of claim 15, wherein the processor is configured to display a control object related to the first image and move the first image according to movement of the control object.

18. A non-transient computer readable recording medium of a first electronic device comprising a program for executing operations of:
communicating with a second electronic device via a communication connection;
displaying, by the first electronic device, a first screen identical to a second screen being displayed in the second electronic device;
displaying a first image superposed on the first screen, wherein the first image is not displayed in the second electronic device,
displaying a second image drawn by a user touch input, wherein the second image is displayed to be superposed on the first image; and
sharing the second image with the second electronic device in a real time such that the second electronic device displays the second image to be superposed on the second screen.

* * * * *